(12) United States Patent
Jandke

(10) Patent No.: US 7,387,646 B2
(45) Date of Patent: Jun. 17, 2008

(54) METHOD OF PROTECTING ORGANIC MATERIAL FROM LIGHT

(75) Inventor: Joachim Jandke, Steinen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 43 days.

(21) Appl. No.: 10/583,597

(22) PCT Filed: Dec. 13, 2004

(86) PCT No.: PCT/EP2004/053418

§ 371 (c)(1),
(2), (4) Date: Jun. 20, 2006

(87) PCT Pub. No.: WO2005/063592

PCT Pub. Date: Jul. 14, 2005

(65) Prior Publication Data

US 2007/0157401 A1    Jul. 12, 2007

(30) Foreign Application Priority Data

Dec. 23, 2003   (EP) .................................. 03104945

(51) Int. Cl.
*B65D 65/16* (2006.01)
*B65D 65/20* (2006.01)
*B65D 81/30* (2006.01)
*B65B 55/00* (2006.01)

(52) U.S. Cl. .................. 8/506; 8/508; 8/509; 8/510; 8/512; 8/513; 8/516; 8/523; 426/106; 426/324; 426/392; 206/828

(58) Field of Classification Search ............... 5/506, 5/508–510, 512, 513, 516, 523; 424/106, 424/324, 392; 206/828
See application file for complete search history.

(56) References Cited

U.S. PATENT DOCUMENTS

| | | | |
|---|---|---|---|
| 6,171,670 B1 | 1/2001 | Sudo et al. | 428/35.7 |
| 2004/0031109 A1 | 2/2004 | Clement et al. | 8/507 |
| 2004/0123403 A1 | 7/2004 | Tzikas et al. | 8/506 |
| 2004/0209981 A1 | 10/2004 | Lazzari et al. | 524/100 |
| 2006/0160933 A1 | 7/2006 | Christensen | 524/87 |

FOREIGN PATENT DOCUMENTS

| | | |
|---|---|---|
| GB | 2 382 560 | 6/2003 |
| WO | WO-02/072707 | * 9/2002 |

* cited by examiner

*Primary Examiner*—Fiona T Powers
(74) *Attorney, Agent, or Firm*—Joseph C. Suhadolnik

(57) ABSTRACT

The present invention relates to a method of protecting organic material, especially from the pharmaceutical, food and nutrition sectors, from light, which method comprises applying to or incorporating in a carrier material a combination of the dye of formula (1) the dye of formula (2) and a UV absorber and, optionally, further dyes, and positioning the so-treated carrier material between the light source and the organic material to be protected

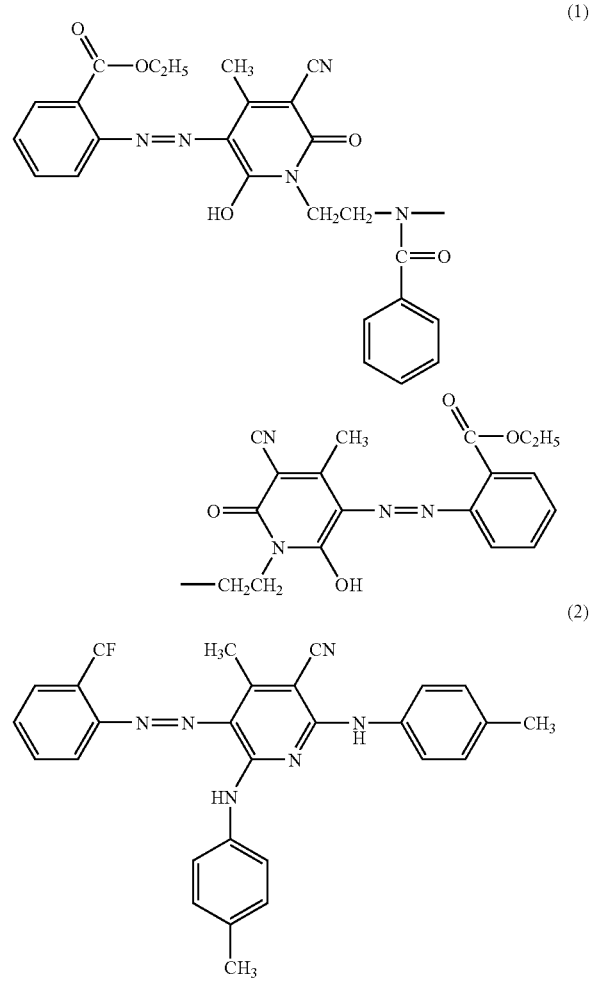

8 Claims, No Drawings

METHOD OF PROTECTING ORGANIC MATERIAL FROM LIGHT

The present invention relates to a method of protecting organic material from damage that daylight ("visible light"), and especially an artificial light, may cause.

Organic material, for example pharmaceuticals or, especially, organic material from the food and nutrition sector, for example vegetables, fruit, meat, contains organic substances that are sensitive to light irradiation, especially in the short-wave range of daylight (up to 500 nm) and in the UV range.

The spectra of daylight and artificial light are different. For example, in the spectrum of a neon tube the proportion of UV from 250 to 400 nm is smaller compared with daylight, but the proportion of light having an extinction from 400 to 500 nm, with a maximum at about 480 nm (blue region), is significantly greater than in the case of daylight.

Many foodstuffs, for example fruit, meat, milk, beer, mushrooms, contain vitamin B2, which is known to be very sensitive to UV light as well as to daylight up to 500 nm.

Vitamin B2, also known by the name riboflavin, is present in high concentrations especially in eggs, milk, liver, cheese and fish.

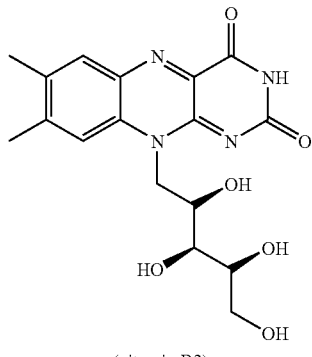

(vitamin B2)

The light sensitivity of riboflavin is also one of the reasons why, for example, milk is mainly stored and sold in tetra-packs that are impermeable to light or in white-coloured bottles.

The use of UV absorbers for protection from light is known per se in the food industry. It has been shown, however, that commercially available UV absorbers are active only in the spectral range of approximately from 300 to 400 nm but not in the likewise critical spectral range of from 400 to 500 nm.

There is accordingly still a need for better protection of organic material from the damaging action of light over the entire critical spectral range.

It has now, surprisingly, been found that the method according to the invention substantially meets the above-mentioned criterion.

The present invention accordingly relates to a method of protecting organic material, especially from the food and nutrition sector, from light, which method comprises applying to or incorporating in a carrier material a combination of the dye of formula

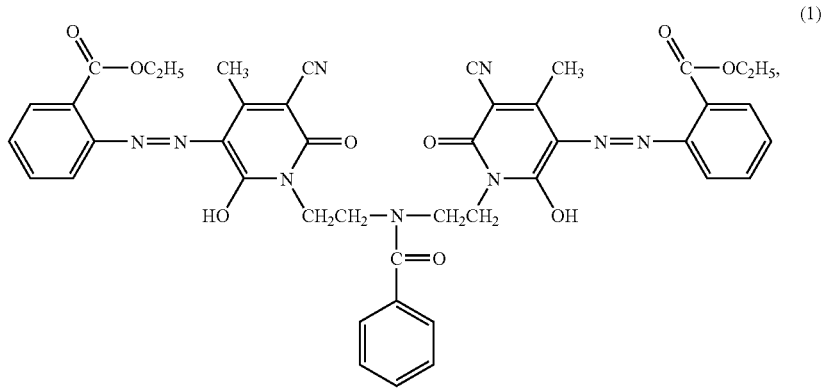

the dye of formula

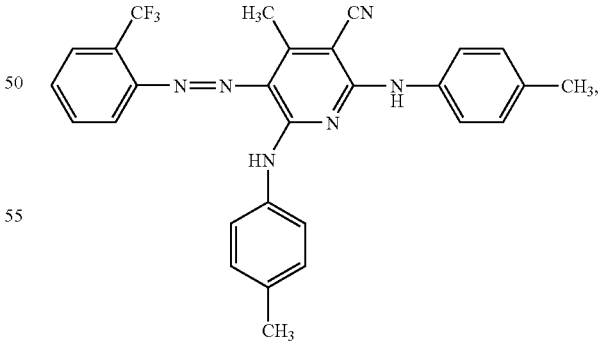

and a UV absorber and, optionally, further dyes, and positioning the so-treated carrier material between the light source and the organic material to be protected.

In addition to the dyes of formulae (1) and (2), other dyes may also be present in the combination according to the invention.

Preference is given to a combination of the dyes of formulae (1) and (2) and the dye of formula

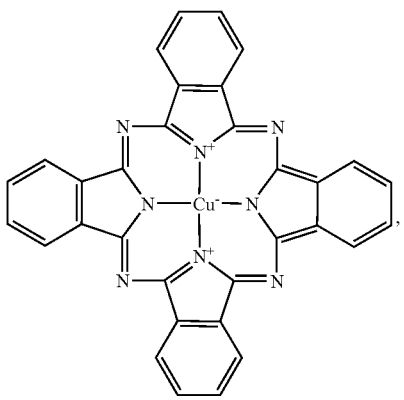

(3)

and a UV absorber.

The amounts in which the combination being used is admixed with the carrier material or applied to the carrier material can vary within wide limits; amounts of from 0.001 to 5% by weight, especially from 0.01 to 2% by weight, more especially from 0.03 to 0.5% by weight, based on the carrier material, have generally proved advantageous.

UV absorbers suitable for the method according to the invention are especially compounds of the classes of 2-(2'-hydroxyphenyl)benzotriazoles, 2-hydroxybenzophenones, esters of substituted or unsubstituted benzoic acid, acrylates, oxamides, 2-(2-hydroxyphenyl)-1,3,5-triazines, monobenzoates of resorcinol or formamidines, as well as a polyester UV absorber of formula

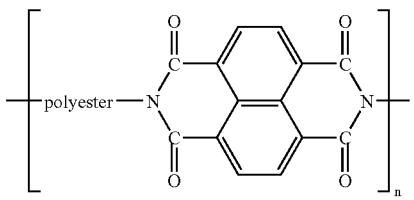

(4)

having a specific weight of from 1200 to 1400, preferably from 1300 to 1350, at 25° C.

From the class of the 2-(2'-hydroxyphenyl)benzotriazoles there may be mentioned, for example, 2-(2'-hydroxy-5'-methylphenyl)benzotriazole, 2-(3',5'-di-tert-butyl-2'-hydroxyphenyl)-benzotriazole, 2-(5'-tert-butyl-2'-hydroxyphenyl)benzotriazole, 2-(2'-hydroxy-5'-(1,1,3,3-tetramethylbutyl)phenyl)benzotyiazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)-phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-iso-octyloxycarbonylethyl)phenyl-benzotriazole, 2,2'-methylene-bis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; $(R-CH_2CH_2-COO-CH_2CH_2)_2$ wherein R=3'-tert-butyl-4'-hydroxy-5'-2H-benzotriazol-2-ylphenyl; 2-[2'-hydroxy-3'-(α,α-dimethylbenzyl)-5'-(1,1,3,3-tetramethylbutyl)phenyl]benzotriazole; and 2-[2'-hydroxy-3'-(1,1,3,3,-tetramethylbuthyl)-5'-(α,α-dimethylbenzyl) phenyl]benzotriazole.

From the class of the 2-hydroxybenzophenones there may be mentioned, for example, the 4-hydroxy-, 4-methoxy-, 4-octyloxy-, 4-decyloxy-, 4-dodecyloxy-, 4-benzyloxy-, 4,2',4'-trihydroxy- and 2'-hydroxy-4,4'-dimethoxy derivatives.

From the class of the 2-(2-hydroxyphenyl)-1,3,5-triazines there may be mentioned, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine 2-(2-hydroxy-4-methoxyphenyl)-4,6-diphenyl-1,3,5-triazin, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

From the class of the oxamides there may be mentioned, for example, 4,4'-dioctyloxyoxanilide, 2,2'-diethoxyoxanilide, 2,2'-dioclyloxy-5,5'-di-tert-butoxanilide, 2,2'-didodecyloxy-5,5'-di-tert-butozanilide, 2-ethoxy-2'-ethyloxanilide, N,N'-bis(3-dimethylaminopropyl)oxamide, 2-ethoxy-5-tert-butyl-2'-ethyloxanilide and the mixture thereof with 2-ethoxy-2'-ethyl-5,4'-di-tert-butoxanilide and mixtures of o- and p-methoxy-disubstituted oxanilides and mixtures of o- and p-ethoxy-disubstituted oxanilides.

As esters of substituted or unsubstituted benzoic acids there may be mentioned, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

From the class of the acrylates there may be mentioned, for example, ethyl α-cyano-β,β-di-phenylacrylate, isooctyl α-cyano-β, β-diphenylacrylate, methyl α-methoxycarbonyl-cinnamate, methyl α-cyano-β-methyl-p-methoxycinnamate, butyl α-cyano-β-methyl-p-methoxycinnamate, methyl α-methoxycarbonyl-p-methoxycinnamate and N-(β-methoxycarbonyl-β-cyanovinyl)-2-methylindoline.

A monobenzoate resorcinol is, for example, a compound of formula

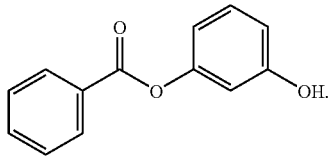
(5)

A formamidine is, for example, a compound of formula

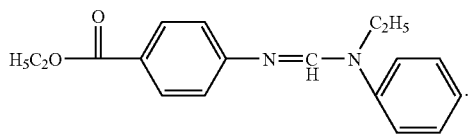
(6)

As UV absorbers there may also be used compositions comprising active methine compounds, for example unsubstituted or substituted malonate esters, such as are described, for example, in U.S. Pat. No. 6,207,740, WO-A-02/14418, EP-A-0 350 386, U.S. Pat. Nos. 4,661,566, 4,749,772 and EP-A-0 272 692.

Following UV absorbers and their mixture may also be used in the method according to the invention; poly(oxy-1,2-ethanediyl),α-[4-(2-cyano-3-ethoxy-3-oxo-1-propenyl)-2-methoxyphenyl]-ω-hydroxy- and poly(oxy-1,2-ethanediyl),α-[4-(2-cyano-3-ethoxy-3-oxo-1-propenyl)phenyl]-ω-hydroxy-.

The combination used in accordance with the invention preferably comprises a UV absorber of formula

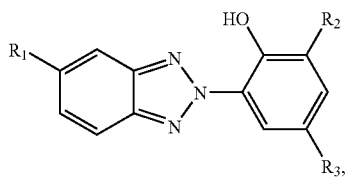
(7)

wherein $R_1$ is hydrogen or halogen, preferably chlorine, $R_2$ is $C_1$-$C_{12}$alkyl, preferably $C_1$-$C_6$alkyl that is unsubstituted or substituted by phenyl, and $R_3$ is $C_1$-$C_{12}$alkyl, preferably $C_1$-$C_6$alkyl that is unsubstituted or substituted by phenyl.

$C_1$-$C_{12}$Alkyl and $C_1$-$C_6$alkyl as $R_2$ or $R_3$ may be linear or may be branched from $C_3$ upwards.

The combination used in accordance with the invention especially comprises one or more UV absorbers of the formulae

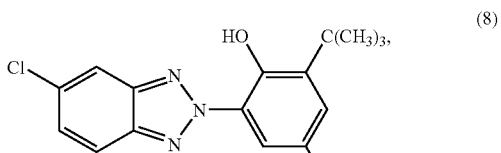
(8)

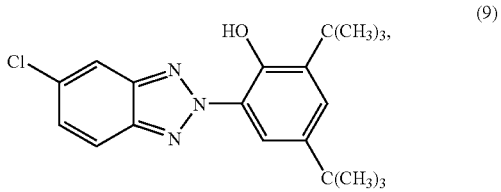
(9)

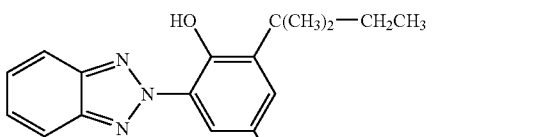
(10)

and

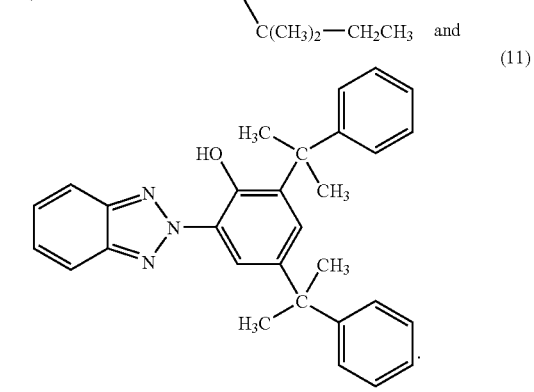
(11)

The amount of the UV absorber may vary within wide limits; advantageously from 0.01 to 1.0% by weight, especially from 0.02 to 0.6% by weight, and more especially from 0.05 to 0.4% by weight of a UV absorber, based on the weight of the carrier material, is used.

The compounds of formulae (1) to (11) are known and can be prepared in a manner known per se according to known methods.

The carrier material suitable for the method according to the invention generally consists of glass or of transparent plastics films or plastics sheets produced from high molecular weight organic material.

Suitable high molecular weight organic materials for the production of the plastics films or sheets are, very generally, polymers, such as especially polyesters (PES, PET), polycarbonate (PC), polystyrene (PS), polymethyl methacrylate (PMMA), polyamide, polyolefins such as polyethylene and polypropylene, polyvinyl chloride, ethyl-butyl acrylate (EBA), polyvinyl butyrate (PVB), styrene/acrylonitrile (SAN) and acrylonitrile/butadiene/styrene (ABS).

Especially preferred are polyesters, polymethyl methacrylate and polyamide. More especially preferred are linear aromatic polyesters obtainable by polycondensation of terephthalic acid and glycols, especially ethylene glycol, or condensation products of terephthalic acid and 1,4-bis(hydroxymethyl)cyclohexane, for example polyethylene terephthalate (PET), polyethylene napthalate (PEN) or polybutylene terephthalate (PBTP); also polycarbonates, for example those obtained from α,α-dimethyl-4,4-dihydroxy-diphenylmethane and phosgene, or polymers based on polyvinyl chloride and on polyamide, for example polyamide 6 or polyamide 6.6.

The method according to the invention is carried out, for example, by admixing the dyes of formulae (1) and (2) and, optionally, (3), and a UV absorber, using extruders, roll mills or mixing or grinding apparatuses, with the plastics or polymeric colour particles used to produce the plastics films or sheets, with the result that the dyes and the UV absorber are dissolved or finely distributed in the high molecular weight material. The addition of the dye components of the combination used according to the invention and of a UV absorber may take place simultaneously or in succession, the order in which they are added being chosen as desired.

The plastics or polymeric colour particles treated in that manner are then processed according to methods known per se to form a film or a sheet or to form mouldings, such as containers for solid or liquid substances, for example containers and bottles for drinks, or for pharmaceutical preparations, for example pills or drops.

Admixture of the dyes and of the UV absorber can also be effected immediately prior to the actual processing step, for example by continuously simultaneously feeding the dye components of the combination used according to the invention, a pulverulent UV absorber and a granulated or pulverulent high molecular weight organic material and, optionally, also additional ingredients, such as additives, directly into the intake zone of an extruder, the constituents being mixed just prior to processing. Generally, however, preference is given to mixing the combination used according to the invention into the high molecular weight organic material beforehand.

It is often desirable, in order to reduce brittleness, to incorporate so-called plasticisers into the high molecular weight compounds prior to the film production. There may be used as plasticisers, for example, esters of phosphoric acid, phthalic acid or sebacic acid. In the method according to the invention, the plasticisers may be incorporated into the polymers before or after the incorporation of the combination used according to the invention. It is also possible, in order to achieve different shades of colour, to add to the high molecular weight organic materials, in addition to the dyes of formulae (1) and (2) and, optionally, (3) also further dyes or other colorants in any desired amounts, optionally together with further additives, e.g. fillers or siccatives.

A further embodiment of the method according to the invention comprises treating glass or previously produced transparent plastics film by, for example, spraying on or applying the combination used according to the invention, or spraying on or applying the dye components of the combination used according to the invention and a UV absorber independently of one another, the spraying or application being carried out in any order.

The above-mentioned materials treated by the method according to the invention, especially those made of polyesters, are distinguished by very good in-use fastness properties, such as especially good fastness to light and to hot light.

The invention relates also to the use of a combination of the dyes of formulae (1) and (2) and, optionally, (3), and a UV absorber in the protection of organic materials against light.

Various methods can be used for introducing the carrier material treated with the combination according to the invention between the light source and the organic material to be protected.

The organic material to be protected may, for example, be encapsulated by a plastics film treated with the combination according to the invention. The film-produced according to the invention can also be used, for example, for covering a greenhouse.

A further possibility comprises applying the combination according to the invention directly, for example, to glass windows, glass bottles, containers or packaging for pharmaceutical products and preparations, to plastics windows or to cupboard doors made from glass or plastics, or providing the glass or plastics windows or the cupboard doors made from glass or plastics with a plastics film treated with the combination according to the invention. In addition, a direct light source, for example a neon tube, can be provided with a finish by application of the combination according to the invention thereto or by adhesion of a plastics film treated with the combination according to the invention.

The following Examples serve to illustrate the invention. Unless otherwise indicated, parts are parts by weight and percentages are percentages by weight. The temperatures are given in degrees Celsius. The relationship between parts by weight and parts by volume is the same as that between grams and cubic centimeters.

EXAMPLE 1

1200.00 g of polyester granules (PET Arnite D04-300, DSM) are pre-dried for 4 hours at 130° C. and then homogeneously mixed with 0.16 g of the dye of formula (1),
0.22 g of the dye of formula (2) and
2.4 g of a UV absorber of formula

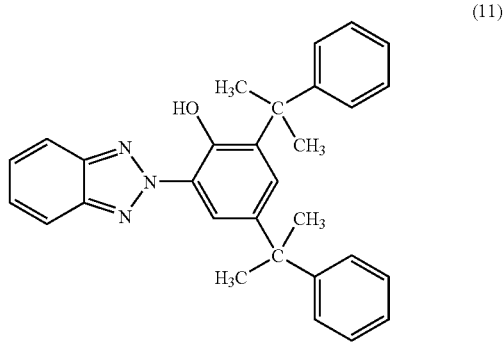

(11)

in a "roller rack" mixing apparatus for 15 minutes at 60 revs/min.

The homogeneous mixture is extruded at a maximum temperature of 275° C. in an extruder (twin screw 25 mm from Collin, D-85560 Ebersberg) having 6 heating zones, and is cooled with water, granulated in a granulator (Turb Etuve TE 25 from MAPAG AG, CH-3001 Bern) and subsequently dried for 4 hours at 130° C.

Yellowish-brown-coloured polyester granules having good allround fastness properties, especially very good fastness to light and to hot light, are obtained, which are processed according to known methods, for example injection moulding, blow moulding, extrusion or calendering, to form sheets or films or to form mouldings, for example containers for solid or liquid substances, for example containers and bottles for drinks, or for pharmaceutical preparations, for example pills or drops.

EXAMPLE 2

1200.00 g of polyester granules (PET Arnite D04-300, DSM) are pre-dried for 4 hours at 130° C. and then homogeneously mixed with
- 0.12 g of the dye of formula (1),
- 0.18 g of the dye of formula (2),
- 0.15 g of the dye of formula (3) and
- 2.4 g of a UV absorber of formula (11) in a "roller rack" mixing apparatus for 15 minutes at 60 revs/min.

The homogeneous mixture is extruded at a maximum temperature of 275° C. in an extruder (twin screw 25 mm from Collin, D-85560 Ebersberg) having 6 heating zones, and is cooled with water, granulated in a granulator (Turb Etuve TE 25 from MAPAG AG, CH-3001 Bern) and subsequently dried for 4 hours at 130° C.

Green-coloured polyester granules having good allround fastness properties, especially very good fastness to light and to hot light, are obtained, which are processed according to known methods to form a sheet or a film or to form mouldings, for example containers for solid or liquid substances, for example containers and bottles for drinks, or for pharmaceutical preparations, for example pills or drops.

What is claimed is:

1. A method of protecting organic material from light, wherein the organic material is a nutritional substance, foodstuff or pharmaceutical, which method comprises applying to or incorporating in a carrier material a combination of the dye of formula

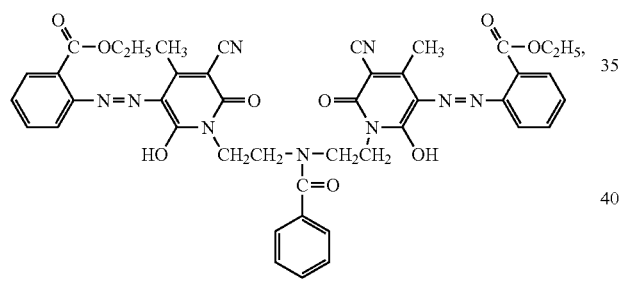

the dye of formula

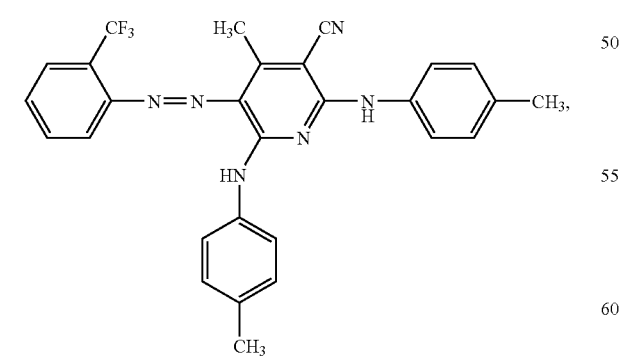

and a UV absorber,
and, optionally, further dyes,
and positioning the so-treated carrier material between the light source and the organic material to be protected.

2. A method according to claim 1 which comprises applying to or incorporating in a carrier material, in addition to the dyes of formulae (1) and (2), a dye of formula

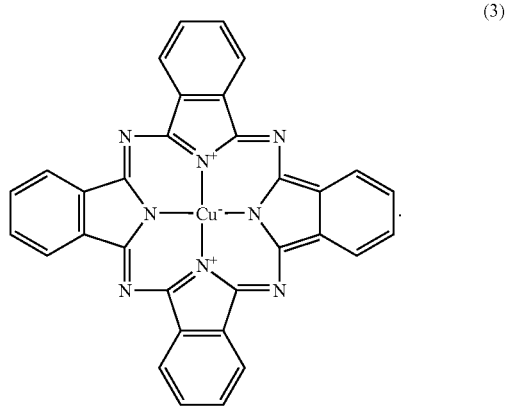

3. A method according to claim 1, which comprises using as UV absorber a UV absorber from the class of the 2-(2'-hydroxyphenyl)benzotriazoles, the class of the 2-hydroxy-benzophenones, the class of the esters of substituted or unsubstituted benzoic acid, the class of the acrylates, the class of the oxamides, the class of the 2-(2-hydroxyphenyl)-1,3,5-triazines, the class of the monobenzoates of resorcinol, the class of the formamidines, or a polyester UV absorber of formula

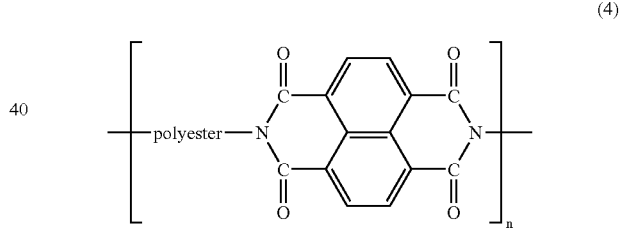

having a specific weight of from 1200 to 1400 at 25° C.

4. A method according to claim 1, which comprises using as UV absorber a UV absorber of formula

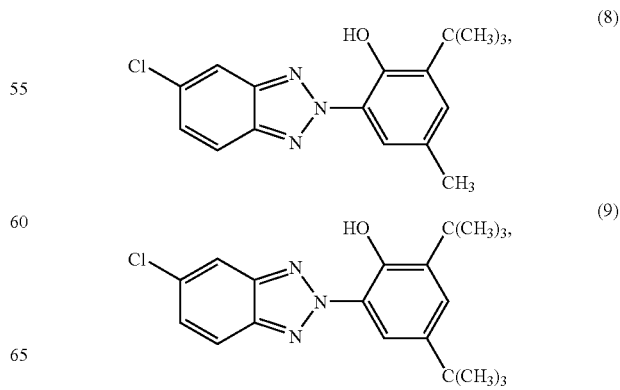

-continued

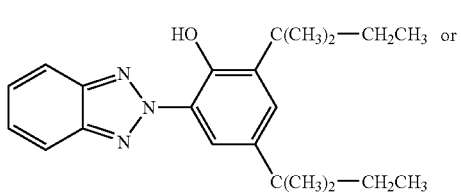
(10)

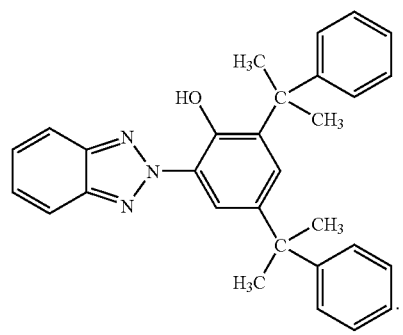
(11)

5. A method according to claim 1, wherein the organic material is a nutritional substance or foodstuff.

6. A method according to claim 1, wherein the organic material is a pharma-ceutical.

7. A method according to claim 2, which comprises using as UV absorber a UV absorber from the class of the 2-(2'-hydroxyphenyl)benzotriazoles, the class of the 2-hydroxy-benzophenones, the class of the esters of substituted or unsubstituted benzoic acid, the class of the acrylates, the class of the oxamides, the class of the 2-(2-hydroxyphenyl)-1,3,5-triazines, the class of the monobenzoates of resorcinol, the class of the formamidines, or a polyester UV absorber of formula (4)

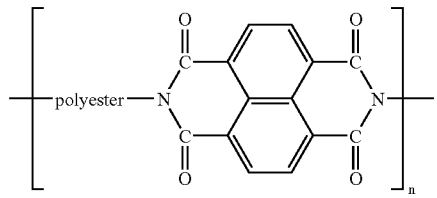

having a specific weight of from 1200 to 1400 at 25° C.

8. A method according to claim 2, which comprises using as UV absorber a UV absorber of formula

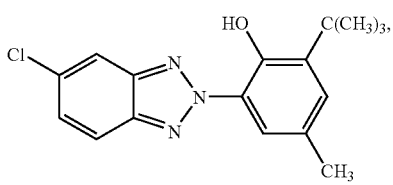
(8)

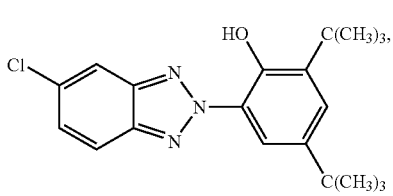
(9)

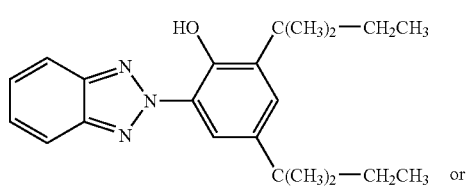
(10)

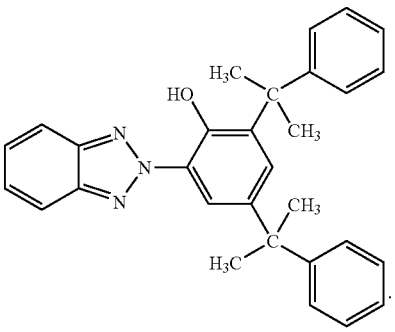
(11)

* * * * *